Patented June 14, 1927.

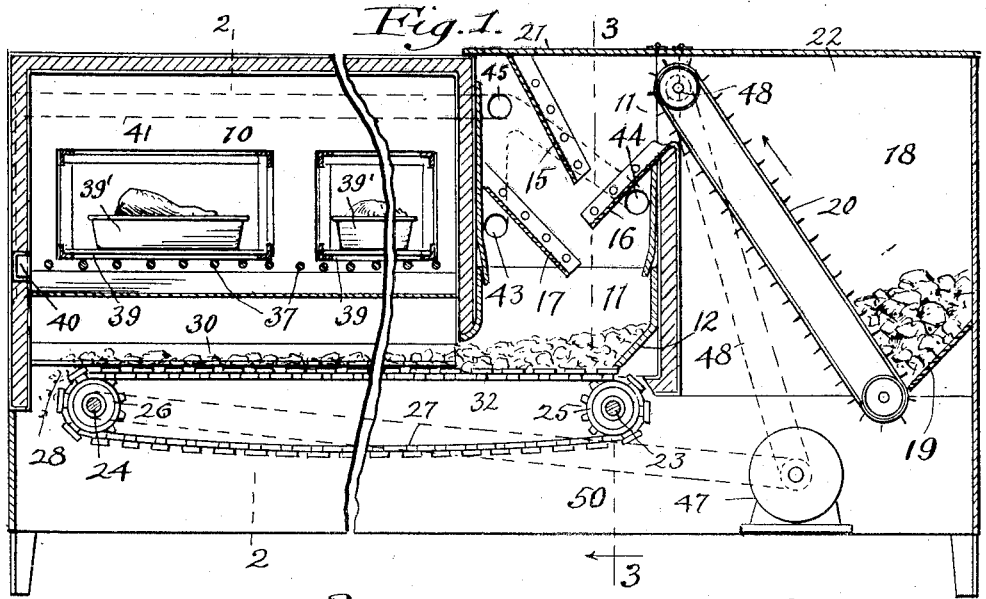
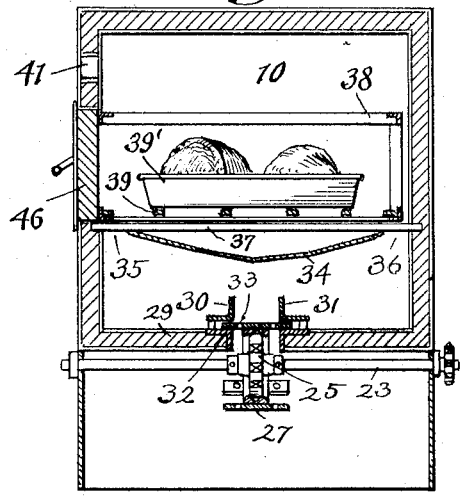
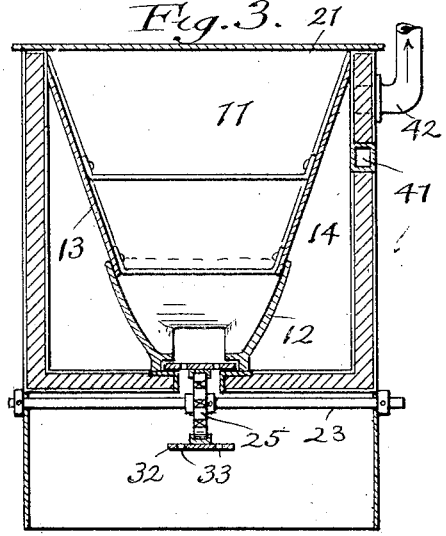
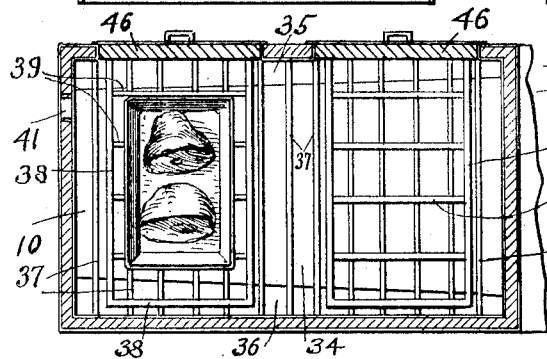

1,632,176

UNITED STATES PATENT OFFICE.

JOHN CRAIN, OF PAINESVILLE, OHIO.

STOVE.

Application filed November 5, 1925. Serial No. 66,901.

This invention relates especially to apparatus for cooking meats and other food products by means of a charcoal fire.

It is one of the objects of the invention to provide an apparatus of the kind referred to in which the fuel is automatically and continuously replenished and in which the articles to be cooked are so arranged as to be subjected to the gases of combustion and to a substantially uniform heat, on all sides.

A further object of the invention is to provide an apparatus of the type referred to that will be especially adapted for use by restaurants and roadside eating places and which will require the minimum amount of attention on the part of the operator.

Other objects of the invention and the features of novelty will be apparent from the following description taken in connection with the accompanying drawings, in which:

Fig. 1 is a longitudinal section through an apparatus embodying my invention;

Fig. 2 is a transverse section on the line 2—2 of Fig. 1;

Fig. 3 is a transverse section on the line 3—3 of Fig. 1; and

Fig. 4 is a plan view of the apparatus with certain parts shown in section.

Referring to the drawings, 10 indicates an oven which is preferably constructed with asbestos-lined side, top and bottom walls so as to be capable of efficiently conserving the heat. At one end of the oven 10 is a combustion chamber 11 having a fire pot 12 in the lower part thereof and sloping side walls 13 and 14, to convey the fuel to the fire pot 12. The combustion chamber 11 has a series of inclined baffles 15, 16 and 17 which are so arranged as to feed the fuel from the space above the baffles 15 and 16 in a zigzag stream to the fire pot 12. Arranged alongside of the combustion chamber 11 is a fuel compartment 18 having a bottom formed by the inclined wall 19 and the apron-conveyor 20, the latter moving in the direction of the arrow in Fig. 1 to carry the fuel, preferably charcoal, upwardly to the space above the baffles 15 and 16. Covers 21 and 22 are arranged over the combustion chamber 18 and fuel compartment.

A shaft 23 is arranged below the fire pot 12 and another shaft 24 is arranged adjacent the remote end of the oven 10. The shaft 23 carries a sprocket 25 and the shaft 24 a sprocket 26 and a fuel conveyor 27 runs on these sprockets to convey the fuel from the fire pot 12 through the lower part of the oven 10, the ashes being discharged at the point 28. Supported on the bottom wall 29 of the oven are the angle irons 30 and 31 which are spaced slightly above the bottom wall to provide grooves in which the ends of the bars 32, on the conveyor 27, run, as shown in Fig. 2. The bars 32 fit closely together along their adjacent edges and are provided with openings 33 to admit air into the trough formed by the angle irons 30 and 31. In this manner sufficient air is supplied to the fuel, on the conveyor 27, to thoroughly burn it by the time it reaches the point 28, it being understood that the conveyor 27 moves very slowly and, in practice, I have found that it is desirable to move the conveyor 27 at such a slow speed that its motion is barely perceptible.

Extending longitudinally through the oven, some distance above the bottom wall 29 thereof is a baffle 34 which may be supported on the end walls of the oven and is preferably tapered in width so as to uniformly distribute the gases of combustion, rising from the fuel on the conveyor 27, by having the spaces 35 and 36 gradually increase in width, from the end of the oven that is adjacent to the combustion chamber 11, to the opposite end. This will best appear from Fig. 4. Above the baffle 34, there are transversely extending bars 37 adapted to support one or more skeleton frames 38 comprising a wire platform or grid 39 which support drip pans 39' containing the articles to be cooked. This arrangement permits the gases of combustion to circulate around all sides of the articles.

At the remote end of the oven, from the combustion chamber 11, there is a discharge opening 40 for the gases of combustion, this opening communicating with a duct 41 extending through the walls of the oven to a chimney 42. There are also openings 43, 44 and 45 for conveying the smoke from beneath the baffles 15, 16 and 17 through ducts in the wall of the combustion chamber, to the chimney 42, so that all of the gases are conveyed away by this chimney. The frames 38 are in the form of drawers having insulated outer walls 46 which close openings in one of the side walls through which the frames are inserted into the oven.

The conveyors 20 and 27 are operated from any suitable source of power, through speed reduction means for driving the conveyors at the proper speed and for purposes of illustration, I have indicated at 47, an electric motor which is operatively connected with the shaft 48, of the conveyor 20, by a chain 49 and with the shaft 24, by a chain 50.

In the operation of the device the fuel is placed in the fire pot and ignited and the burning coals are carried along by the conveyor 27 through the oven, being supplied by air through the openings 33 so that they are entirely consumed by the time that they reach the point 28 where the ashes are discharged. The conveyor 20 carries the fuel upwardly from the chamber or bin 18 to the upper part of the combustion chamber and it is gradually fed by the baffles 15, 16 and 17 into the fire pot so that the apparatus is capable of continuous operation without attention on the part of an operator to replenish the fuel. By having the conveyor 20, it is possible to keep the reserve fuel supply, in the bin 18, entirely away from the fire.

Having thus described my invention, I claim:

1. In apparatus of the class described, the combination of a combustion chamber, an oven, means in said oven for supporting the articles to be cooked, and a continuous conveyor for carrying the burning fuel from said chamber through said oven.

2. In apparatus of the class described, the combination of a combustion chamber, an oven, means in said oven for supporting the articles to be cooked, a continuous conveyor for carrying the burning fuel from said chamber through said oven, and means for supplying air to the fuel throughout its travel through the oven.

3. In apparatus of the class described, the combination of a combustion chamber, an oven, means in said oven for supporting the articles to be cooked, a continuous conveyor for carrying the burning fuel from said chamber through said oven, and said conveyor having openings for supplying air from below to the fuel thereon.

4. In apparatus of the class described, the combination of a combustion chamber, oppositely inclined baffles in said chamber for feeding the fuel downwardly by gravity in a zig-zag path, a fire pot in the bottom of said chamber, an oven alongside said chamber, an endless conveyor running in a substantially horizontal direction through said fire pot and said oven, longitudinally extending guides at the sides of said conveyor and forming therewith a trough through which the burning fuel is conveyed, means for supplying air from below the conveyor to the fuel thereon and thence to the interior of said oven, means for distributing the gases of combustion from the burning fuel on said conveyor throughout the upper part of said oven, and means for driving said conveyor.

5. In apparatus of the class described, the combination of a combustion chamber, oppositely inclined baffles in said chamber for feeding the fuel downwardly by gravity in a zig-zag path, a fire pot in the bottom of said chamber, an oven alongside said chamber, an endless conveyor running in a substantially horizontal direction through said fire pot and said oven, longitudinally extending guides at the sides of said conveyor and forming therewith a trough through which the burning fuel is conveyed, means for supplying air from below the conveyor to the fuel thereon and thence to the interior of said oven, a horizontally arranged baffle in said oven over said conveyor and spaced from the side walls of the oven to distribute the gases of combustion from the burning fuel on said conveyor throughout the upper portion of the oven, means for supporting the articles to be cooked in the space above the last mentioned baffle, and means for driving said conveyor.

6. In apparatus of the class described, the combination of a combustion chamber, oppositely inclined baffles in said chamber for feeding the fuel downwardly by gravity in a zig-zag path, a fire pot in the bottom of said chamber, an oven alongside said chamber, an endless conveyor running in a substantially horizontal direction through said fire pot and said oven, longitudinally extending guides at the sides of said conveyor and forming therewith a trough through which the burning fuel is conveyed, means for supplying air from below the conveyor to the fuel thereon and thence to the interior of said oven, a horizontally arranged baffle in said oven over said conveyor and spaced from the side walls of the oven to distribute the gases of combustion from the burning fuel on said conveyor throughout the upper portion of the oven, means for supporting the articles to be cooked in the space above the last mentioned baffle, a fuel bin, a conveyor for conveying fuel from said bin to the upper part of said combustion chamber, and means for driving said conveyors.

In testimony whereof, I hereunto affix my signature.

JOHN CRAIN.